United States Patent [19]

Du Bourg et al.

[11] Patent Number: 4,826,017

[45] Date of Patent: May 2, 1989

[54] VIBRATING SCREEN

[75] Inventors: Noel J. Du Bourg; Graham De Klerk, both of Transvaal, South Africa

[73] Assignee: Velmet (Proprietary) Limited, Sandton, South Africa

[21] Appl. No.: 859,651

[22] Filed: May 5, 1986

[30] Foreign Application Priority Data

May 3, 1985 [ZA] South Africa ........................ 85/3317

[51] Int. Cl.$^4$ ............................ B07B 9/00; B07B 1/28; B01D 33/00

[52] U.S. Cl. ..................................... 209/234; 209/269; 209/275; 210/388; 210/389

[58] Field of Search ................ 209/83, 234, 240, 241, 209/243, 245, 252, 268, 269, 273, 274, 275, 276, 281, 282, 309, 311, 250, 313; 210/388, 389

[56] References Cited

U.S. PATENT DOCUMENTS

| | | | |
|---|---|---|---|
| 830,349 | 9/1906 | Meurer | 209/269 |
| 1,179,842 | 4/1916 | Kirksey | 209/269 |
| 1,251,500 | 1/1918 | Gentes et al. | 209/269 X |
| 2,317,430 | 4/1943 | Ayers et al. | 209/268 |
| 2,632,366 | 3/1953 | Ahlfors | 209/269 |
| 2,916,142 | 12/1959 | Fontein | 209/274 |
| 2,984,622 | 5/1961 | Bruninghaus | 210/388 X |
| 3,124,530 | 3/1964 | Jakobs | 209/269 X |
| 3,306,671 | 2/1967 | Leeman | 209/250 X |
| 3,353,674 | 11/1967 | Leeman | 209/240 |
| 3,813,298 | 5/1974 | Chwalek | 209/274 X |
| 4,025,419 | 5/1977 | Musschoot | 209/3 |
| 4,062,768 | 12/1977 | Elliot | 209/341 |
| 4,267,046 | 5/1981 | Stoev et al. | 210/388 X |
| 4,330,413 | 5/1982 | Wilson | 209/269 X |
| 4,505,812 | 3/1985 | Lees | 209/269 X |
| 4,512,880 | 4/1985 | Connolly | 209/250 |
| 4,519,902 | 5/1985 | Kinder | 209/275 X |

FOREIGN PATENT DOCUMENTS

| | | | |
|---|---|---|---|
| 0693956 | 7/1940 | Fed. Rep. of Germany | 209/250 |
| 2348073 | 4/1975 | Fed. Rep. of Germany | 209/269 |
| 81024 | 10/1955 | Netherlands | 209/274 |
| 0862441 | 3/1961 | United Kingdom | 209/281 |

OTHER PUBLICATIONS

Brust, "Vibrated Sieves Solve Fines Problem At Prep Plant", Coal Mining & Processing, pp. 75, 76 & 81, Sep. 1980.
Coal Age, Jan., 1976, pp. 92, 94, 95, The Role of Vibrating Screens in Modern Coal Preparation Plants (George E. Groseclose).
Coal Age, Jan., 1978, pp. 87–88.
Coal Age, Jun., 1978, p. 121.
Coal Preparation, 1979, pp. 8-43-8-45 and 10-8-10-11, J. W. Leonard et al.
SME Mineral Processing Handbook, 1985, pp. 3E-2-0-22, Norman L. Weiss.
Coal Prep 85 Conference Papers, 1985, pp. 454-457, Mechanical Dewatering of 28×100 Mesh Fines on Vibrated Sieve Bends (By: David W. Brentz).

Primary Examiner—Johnny D. Cherry
Assistant Examiner—Edward M. Wacyra
Attorney, Agent, or Firm—Chilton, Alix & Van Kirk

[57] ABSTRACT

A vibratory screening device for dressing, sizing, desliming, and dewatering feed streams of fine particulate material is comprised of a vibratory sieve bend screen and a vibratory planar screen deck. The sieve bend screen is positioned at the feed end of the planar screen deck and is arranged so that linear vibratory motion acting on the sieve bend screen is substantially tangential to the arcuate midsection of the sieve bend. Advantageously, the two units can be mounted on a single frame so that only a single vibratory drive is required for imparting linear vibratory motion to both the sieve bend and the planar screen deck. The linear vibratory motion is preferably at an angle of about 40° to the main planar deck and imparts a counter-current force to the fine particulate material flowing across the mid-section of the sieve bend. This vibratory motion will tend to impede the flow of the feed stream along the sieve bend, thereby increasing the resident time of the solids on the sieve bend and thereby achieve improved screening efficiency.

23 Claims, 3 Drawing Sheets

VIBRATING SCREEN

BACKGROUND AND SUMMARY OF THE INVENTION

The present invention generally relates to a new and improved vibrating screen and method for dressing, sizing, desliming or dewatering feed streams of fine particulate material. More particularly, the present invention relates to a vibratory sieve bend screen and to a combination thereof with a planar screen deck to substantially improve the dressing desliming and dewatering of feed streams, such as solid/liquid slurry mixtures and to an improved method of performing such functions.

In the dewatering of solid/liquid slurry mixtures of fine grained particles, such as coal mineral ore, or the like, it is frequently the practice to use two separate pieces of apparatus. The first is a static sieve bend screen used for preliminary dewatering followed by a substantially horizontal vibrating screen deck which performs further dewatering of the feed stream. This technique is used extensively in the coal industry and a typical example of a coal preparation plant utilizing this system can be found in the text entitled "Coal Preparation" published by the American Institute of Mining, Metallurgical and Petroleum Engineers, Inc., New York, (1979) at Chapter 8, pages 43-45 and Chapter 10, pages 7-11. Conventional sieve bends used in those techniques comprise a vertically disposed stationary concave screen made from a plurality of spaced bars arranged perpendicular to the direction of feed across the screen. The feed stream is applied to the top of the sieve bend and flows by gravity down the concave screen where thin laminae of the stream are removed as it progresses along the screen. The operation of these sieve bend screens is based on successive bars of the sieve bend engaging succeeding layers of the slurry mixture thereby removing water and particles from such layers to a depth of approximately one-quarter the aperture width. The particles passing through the apertures typically have a diameter of less than one-half the aperture width. The use of sieve bends is described in the publication "SME Mineral Processing Handbook" published in 1985 by the American Institute of Mining, Metallurgical and Petroleum Engineers. Reference may also be made to U.S. Pat. Nos. 3,353,674 and 4,512,880.

In some installations, it is known that the sieving action of the sieve bend screen is considerably enhanced by rapping or striking the underside of the screen to dislodge particles trapped in the apertures. In all known screens of this type, the principal motion imposed on the screen by the rapping or vibrating devices is normal or nearly normal to the direction of flow of the material across the screen. At the Coal Preparation Conference held as recently as May 1985, a paper was presented by David W. Brentz entitled "Mechanical Dewatering of 28×100 Mesh Fines On Vibrated Sieve Bends". As indicated in that paper, rapped sieve bends have been utilized to improve the removal of liquid and minus 100 mesh material. The rapped sieves unfortunately allow significantly high amount of oversized material in the effluent. Additionally, as stated in U.S. Pat. No. 4,519,902, the rappers on such sieve bends can cause destruction of the correlation between aperature spacing and particle size and the amplitude of vibration frequently is uneven over the entire length of the screen thereby reducing the efficacy of the vibration imposed on the screen.

Another disadvantage of the utilization of a static or rapped sieve bend in combination with a horizontal vibrating screen is that significant floor space and head room is required for such devices since the sieve bend is positioned well above the imput end of the horizontal vibrating screen thereby requiring head room for both pieces of equipment of about 15 to 20 feet. Additionally, the capital costs and maintenance costs associated with two separate pieces of equipment is significant. Further, although rapped sieve bends significantly overcome the clogging or blinding problem previously associated with the static devices, the mechanically rapped or vibrated sieves exhibit inefficiencies as dewatering devices. The rappers act on the sieve bend to provide a force component in a direction essentially normal or perpendicular to the screen surface thereby tending to force the entire slurry away from the separating action of the sieve bend deck. Additionally, such devices accelerate fatigue and wear of the screen.

To avoid these deficiencies, certain sieve structures such as that described in U.S. Pat. No. 4,519,902 impart a circular or elliptical vibratory motion to a floating sieve screen and frame so as to provide better distribution of the vibration over the entire screen and to circumvent the localized wear and fatigue associated with the rapping operation. Nevertheless, the vibratory motion employed is a non-linear elliptical motion with a throw that is essentially vertical.

Accordingly, it is an object of the present invention to provide a new and improved sizing and dewatering screening device and method having improved dewatering efficiency relative to the screens mentioned hereinbefore. Included in this object is the provision for a single vibratory screening device that utilizes a separate sieve screen and planar screening deck mounted in a common frame in a unique and efficient manner with the entire mechanism vibrated in unison and in a preselected linear straight line direction relative to the travel of the feed stream across the surface of the sieve screen. Advantageously, the device eliminates the need for separate frames and vibratory drives thereby lowering capital costs and maintenance while reducing the number of machines required to handle the same capacity.

Another object of the present invention is to provide a new and improved vibratory screening apparatus and method employing a concave or straight sieve screen wherein the vibratory motion imparted thereto is linear and is not in a direction normal to the screen surface. Included in this object is the provision for the application of vibratory motion that is effective to impede the flow along the sieve thereby increasing the retention time of particles on the sieve and substantially improving the dewatering performance of the device.

Still another object of the present invention is to provide a new and improved dewatering or classifying apparatus and method that imparts to the particles flowing therealong a significant reversal in the direction of flow and interruption of momentum from the sieve portion of the device to the planar deck portion thereof so as to momentarily impede and thereby further improve the retention time on the screening surface and enhance the efficiency of operation.

A further object of the present invention is to provide a new and improved screening apparatus of the type described that permits nesting of an arcuate or straight sieve within the principal vibratory screen frame so as to permit savings in floor space and head room thereby reducing plant costs and achieving more efficient and economical operation.

A still further object of the present invention is to provide a new and improved screening device of the type described wherein the sieve portion of the vibratory device may be adjustable so as to alter its angle of inclination within its supporting frame thereby permitting the operator to select an appropriate inclination resulting in optimum screening performance.

Other objects will be in part obvious and in part pointed out more in detail hereinafter.

These and related objects and advantages are achieved in accordance with the present invention by providing a vibratory screening device for dressing, desliming and dewatering a stream of fine mineral particles flowing along the device. The device comprises a sieve screen having a midsectional zone for screening or dewatering the stream of particles and a discharge point at the downstream end of said midsectional zone. The device also includes a frame fixedly mounting the sieve screen for vibratory movement and linear vibrator drive members mounted on the frame for imparting straight line linear vibratory motion to the sieve screen, the linear motion being in a direction that imparts a counter current force to the particle flow at the midsectional zone of the sieve screen.

In a preferred embodiment, the device further includes a planar screen deck having a slightly upwardly inclined main deck portion extending from a feed end thereof and adapted for the vibratory conveyance of the mineral particles away from the feed end. The frame mounting the concave sieve screen also fixedly mounts the planar screen deck for common linear vibratory movement with the sieve screen in a direction tangential to the midsection of the sieve. The sieve screen and the screen deck are arranged so that the flow of particles along the sieve toward its discharge end is in one flow path direction while the particles deposited on the screen deck by the sieve flow in a direction generally opposite to that first flow path direction whereby the particles flowing along the sieve must undergo a reversal in direction of flow upon reaching the feed end of the deck.

The present invention further includes a method of vibratory screening that comprises the steps of feeding a particle stream to a vibratory sieve for gravity flow therealong and imparting straight line linear vibratory motion to the sieve in a direction substantially aligned with the flow across the midsectional zone of the sieve so as to impart to the particles thereon a desired principal force in a direction counter current to the flow of the particles and provide a first stage screening of the particle stream. Subsequently, the particles from the sieve are discharged therefrom and directed onto a planar vibratory screen deck for vibratory conveyance therealong in a direction generally opposite to the flow direction at the discharge end of the sieve screen so that a second stage screening of the particle stream takes place along the screen deck.

The sieve screen may be constructed so that the inclination thereof may be adjusted and the underflow from the sieve bend screen is separately collected for treatment apart from the underflow of the planar screen deck. The upward main deck portion of the planar screen deck is effective to partially resist the flow of the particles therealong and the common linear vibratory motion of the entire device is effective for advancing the particle stream towards the discharge end of the deck. In the preferred embodiment, the planar screen deck has an initial relatively short downwardly sloping portion and a relatively long upwardly inclined main deck portion arranged so that the linear vibratory motion of the device imparts an upward and forward movement to the particle stream flowing therealong. The combination is effective to provide both dewatering or screening of a particle slurry and its forward conveyance along the deck resulting in a particle cake at the discharge end of the deck that is essentially drip free.

A better understanding of this invention will be obtained from the following detailed description and the accompanying drawings which set forth illustrative embodiments indicative of the way in which the principles of the invention are employed including the several steps of the method and the relationship of one or more of such steps with respect to each of the others.

DESCRIPTION OF THE PREFERRED EMBODIMENTS

Figure 1:
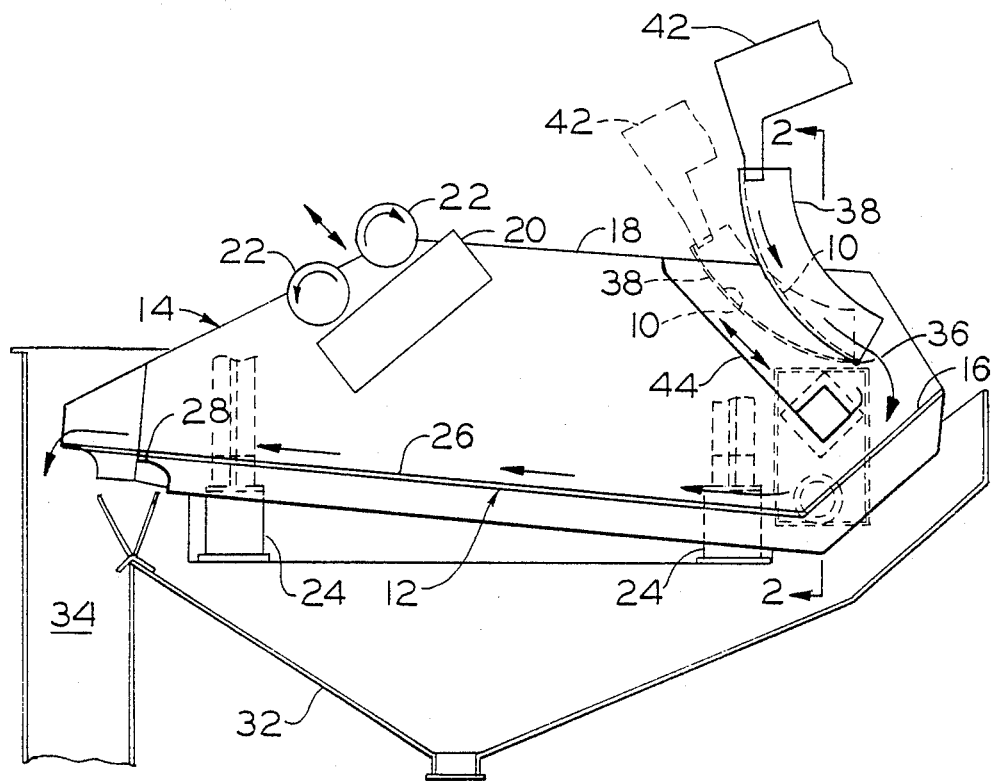
FIG. 1 is a side elevational view, partly in section, of the combined vibratory sieve bend and screening deck of the present invention.

Referring now to the drawings in greater detail wherein like reference numerals indicate like parts throughout the several figures, a vibratory device is shown as generally comprising a sieve screen 10 and a multi-stage planar screen deck 12 mounted within a common vibratory frame 14 for simultaneous linear vibratory motion. The sieve 10 and the planar screen deck 12, although commonly joined and simultaneously vibrated as a result of their fixed interconnection to the common frame 14, nevertheless are separated or spaced from each other in such a manner that the discharge from the sieve flowing generally in a rearward direction falls free from the sieve onto the feed end 16 of the planar screen deck 12 where it undergoes a reversal in direction of flow and a disruption in its flow momentum.

The common frame 14 of the screening device includes a pair of spaced generally parallel side wall members 18 interconnected by a number of supporting rails (not shown) as well as by a bridge support 20 for the vibrator drive motors 22. The frame is mounted on a suitable stationary support through a plurality of vibration isolating mounts, cushions or springs 24 located adjacent the front and rear of the device on opposite side thereof and secured to the frame 14 by an appropriate connection to the side wall members 18.

In the specific embodiment illustrated the frame 14 supports a planar screen deck 12 of multiple slope configuration that extends between the two side wall members 18 adjacent the isolation mounts 24. The main portion 26 of the screen deck leading to the front or discharge end 28 thereof extends between and slightly beyond the longitudinal spacing of the four support members 24. Although the main portion 26 of the deck could be mounted in a horizontal position, it is preferred in accordance with the present invention to provide a slight incline toward the discharge end 28, the inclination being less than 10 degrees and typically on the order of four to eight degrees. The preferred incline is about five degrees. The rear of feed end 16 of the deck slopes downwardly toward and connects directly with the inclined main portion 26 of the deck so as to form a continous screening surface for the deck. The sloping rear portion 16 intersects the main portion 26 of the deck at an angle of about 45 degrees and is appreciably shorter, being only about one-fifth the length of the main deck portion. The entire screen deck 12 is preferably formed from modular snap-in deck panels of an abrasion-resistant elastomeric composition that provides long wear life and results in minimum replacement cost when localized wear occurs. Of course, other materials such as stainless steel and other types of screening may readily be employed. As shown, an underflow collection hopper 32 is positioned below the screen deck along its entire extent for collecting the underflow discharge from the deck during the screening operation while a separate chute 34 is provided forwardly thereof for receiving the cake of solids discharged from the front end 28 of the deck.

Figure 3:
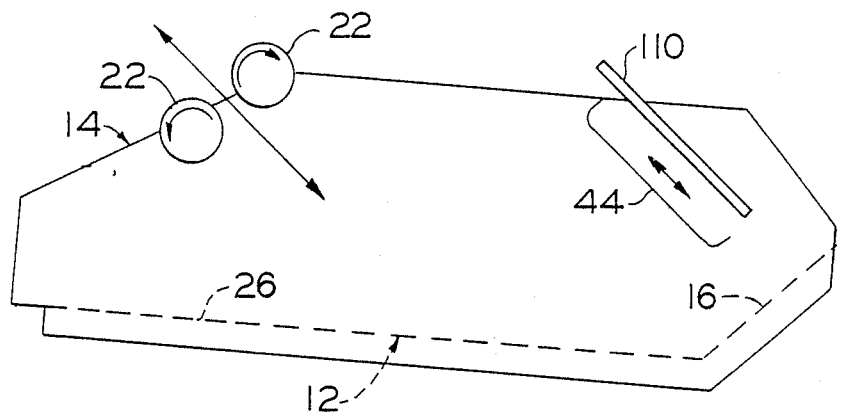
FIG. 3 is a schematic illustration of an alternative embodiment of the combined device of FIG. 1.
Figure 4:
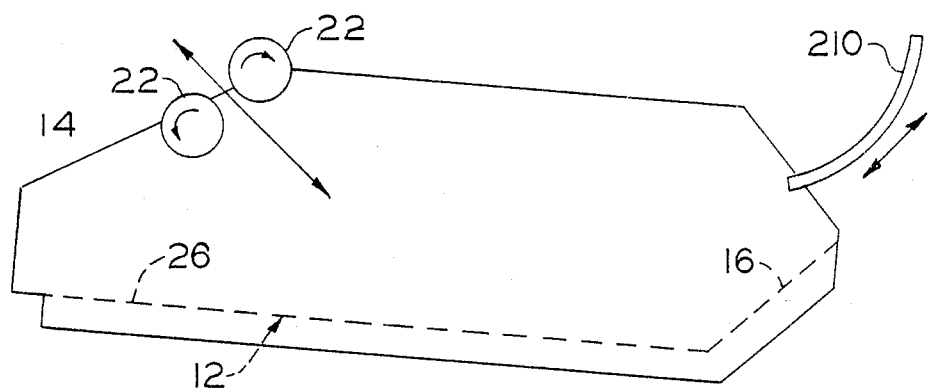
FIG. 4 is a schematic illustration of another alternative embodiment of the combined device of FIG. 1.

Although the sloping rear feed section 16 of the screen deck tends to function as a built-in straight sieve bend, it is a primary feature of the present invention that a separate concave or straight sieve bend 10 is incorporated into the screening device and secured within the same frame so as to undergo a linear vibrating motion in a direction substantially aligned with and tangential to the midsectional zone of the sieve bend. The sieve bend structure itself is of relatively conventional design, can be of concave configuration as shown in FIGS. 1 and 4 or of straight configuration, as shown in FIG. 3, and is pivotally secured at its lowermost end 36 to the frame through a suitable connection with the side wall members 18. The sieve bend 10 shown in FIG. 1 extends generally in a vertical direction with its pivotally connected discharge end 36 being disposed essentially normal to the sloping feed end 16 of the screen deck. In accordance with the present invention and as shown in phantom, the sieve bend may be adjustably positioned as required. The sieve bend may be moved from a position with its uppermost feed end 38 in a substantially vertical position as shown in solid line in FIG. 1 to a more inclined position shown in phantom or may be placed in an intermediate position therebetween. As will be appreciated, a typical feed hopper 42 of adjustable length can be provided so as to direct the particle feed stream to the uppermost end 38 of the sieve bend regardless of its adjusted position. Additionally, if desired, multiple sieve bend screens can be used to feed material to the single screen deck.

Figure 2:
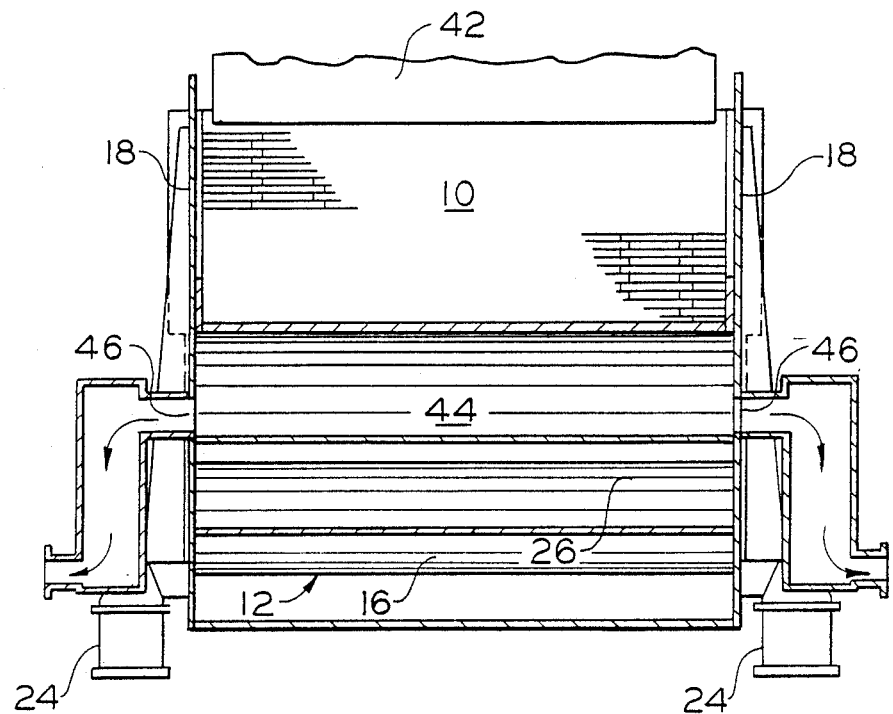
FIG. 2 is a sectional view of the device of FIG. 1 taken along the line 2—2.

Fixed between the side wall members 18 of the common frame and generally below the sieve bend 10 is a separate collection trough 44 for collecting the underflow from the sieve bend. The trough 44 is provided with laterally extending ports 46, as best shown in FIG. 2, for discharging and separately collecting the underflow from the sieve bend. This is particularly important since the underflow from the sieve bend may have significant minerals entrained therein and further separation and recovery of such minerals may be required. For example, where the material being treated is coal which has been cleaned employing the dense medium processes, the underflow from the sieve bend screen may contain a significant amount of magnetite rich liquid and separate recovery thereof in a concentrated state is desirable. The exit port 46 for the underflow collection trough 44 may be through the rear of the machine, at one side of the machine, or on both sides, as shown in FIG. 2.

Advantageously, the structure of the screening device of the present invention enables the utilization of a single vibrating mechanism for both the sieve bend and the screen deck. The vibratory drive mechanism should be of a type that will impart straight line linear vibratory motion to the assembly in a direction tangential to the midsectional zone of the sieve bend. In the specific embodiment illustrated, the vibratory drive mechanism employed takes the form of a pair of electric vibrator motors 22 installed so that the rotors are parallel and the rotation of each motor is reciprocally opposite. The two motors will run synchronously and develop cummulative forces within the desired straight line direction and at the same time provide a totally effective way of generating efficient, straight line vibratory motion. As will be appreciated, the amplitude of the vibration may be easily adjusted by changing calibrated counter weights fixed to the motor shafts. As best shown in FIG. 1, the motors 20 are mounted on the frame 14 by means of the motor bridge, extending between the side wall members 18 of the frame. The bridge 20 and motors 22 are arranged relative to the remainder of the device so as to provide a linear straight line vibratory motion in the direction shown by the arrows. In the preferred embodiment, this linear action is at an angle of about 40 –45° to the main screen deck 26 and, therefore, is substantially perpendicular or normal to the sloping feed end portion 16 of the screen deck. At the same time, the vibratory action is aligned with or tangential to flow along the mid-sectional zone of the sieve bend 10 that extends to the discharge end of the sieve. In the preferred embodiment the motors 20 are operated synchronously at speeds ranging from 500 to 2000 rpm. Of course other linear motion imparting devices may be used.

The screening structure used in the sieve bend may be the typical stainless steel wedge wires designed with slotted aperatures running at right angles to or parallel to the feed stream flow. Alternatively, molded polyurethane or other elastomeric screen decking may be used. The typical screen aperatures in both the sieve bend portion and the planar deck portion of the device fall within the range of about six millimeters down to 0.25 millimeters or smaller.

In operation the particle feed stream of coal, ore or the like is fed from the feed hopper 42 to the upper end 38 of the sieve bend screen 10 and progresses under the influence of gravity along the concave longitudinal extend of the sieve bend. As the feed stream passes from the upper end or feed point 38 on the sieve bend toward the lower discharge end 36 thereof liquid and fine particles are removed from the feed stream through the openings in the sieve bend and are collected within the underflow trough 44. The desliming, dewatering and sizing action of the sieve bend is substantially enhanced by the linear straight line vibration imparted to the sieve bend by the vibratory motors 20 supported on the frame. This linear vibratory motion, as mentioned hereinbefore and as indicated by the arrows, is tangential to the flow of the feed stream along the middle and lower portions of the curved sieve bend. The vibration along these portions, referred to as the midsectional zone, tends to impede the flow of the feed stream thereby increasing the residence time of the solids on the sieve bend. This impedance to the downward flow of the slurry across the surface of the sieve bend, particularly along the midsectional zone extending to the discharge end of the sieve bend, results in a drier product than is conventionally delivered from sieve bend screens utilized heretofore. The vibratory action causes the particles to follow a saw-tooth path down the sieve bend as they progress along the midsectional zone of the sieve bend. This path, of course, results from the particles being thrown rearwardly by the linear vibratory action imparted to the screen, thus impeding their downward flow and increasing their retention time on the sieve bend screen.

The partially dewatered feed stream is discharged from the lower discharge end 36 of the sieve bend and is directed toward the downwardly sloping feed end portion 16 of the planar screen deck. The feed stream, of course, falls by gravity from the sieve bend but, as will be appreciated, is generally heading in a direction toward the rear of the machine. Consequently, as it reaches the sloping feed end 16 of the screen deck it undergoes a reversal in flow direction and momentum. The momentum that has been built up as a result of its flow along and from the sieve bend is abruptly interrupted and the particle stream is now subject to a vibratory action that is essentially normal to the downwardly sloping screen deck's feed end portion 16. This will tend to fully disrupt and agitate the stream, permit the rear feed section 16 of the screen deck to act in a manner similar to a conventional sieve bend where the feed slurry will undergo a second draining, dewatering or classifying operation or stage. If desired the effluent passing through the rear section 16 may be separately collected for further processing.

The travel along the sloping deck portion 16 is for only a short distance before it reaches the significantly longer main planar portion 26 of the screen deck. The main portion, as indicated, is slightly inclined at an angle of about four to eight degrees from the horizontal and will require that the flow of the particle stream progress or climb up the incline. In view of the inclination of the screen deck, the particles encounter difficulty in moving toward the discharge end 28 and thus also tend to accumulate and remain on the screen deck for an extended period. However, in this instance, the action of the vibrator imparts to the screen a straight line linear motion in a direction that tends to convey or push the particles toward the discharge or front end 28 of the screen deck. Where desired, a discharge weir (not shown) may be positioned at the discharge end so as to increase the depth of the cake carried by the screen deck prior to discharge thereof into the chute 34.

If desired, additional washing or rinsing of the solids being conveyed along the elongated inclined main portion of the planar screen deck can be effected using water sprays that may be located at convenient locations above the deck surface. Since such water sprays are conventional, they have not been illustrated in the drawing. However, even when such water sprays are employed in accordance with the present invention, the cake reaching and being discharged at the discharge end of the screen deck typically is a consistently drip-free cake of solid particles.

An alternative embodiment of the screening device of the present invention is shown schematically in FIG. 3 where a straight sieve 110 is used in place of the sieve bend screen 10 of FIG. 1. The remainder of the device is essentially unchanged so that the direction of linear straight line vibratory motion is aligned with the rearwardly sloping sieve 110. In this way the same type of sieving or screening forces are applied to the particle stream as it follows a saw tooth flow path downwardly along the straight sieve screen 110.

A further alternative embodiment of the screening device of the present invention is shown schematically in FIG. 4 where an arcuate sieve bend 210 is turned 180 degrees relative to the position shown in FIG. 1 so that the flow of the feed stream does not change direction when the stream passes from the sieve bend to the screen deck. In this embodiment, it is necessary to utilize a separate linear vibratory drive (not shown) for the sieve bend in order to maintain the straight line vibratory action on the sieve bend in a direction substantially tangential to the midsectional zone of the sieve bend and opposing the downward flow of slurry across the sieve bend. It may be preferred, depending on the particular application, to eliminate the initial sloping portion of the planar screen deck. However, for purposes of illustration, the sloping portion 16 has been retained within the embodiment shown in FIG. 3. As can be appreciated, the utilization of a structure such as that shown in FIG. 3 will necessitate complete separation of the sieve bend 10 from the screen deck 12 such that a separate frame also will be required for the sieve bend as well as a separate vibratory drive. It will, of course, be appreciated that the principles of operation of the embodiment shown in FIG. 4 are substantially the same as those discussed hereinbefore with respect to the preferred embodiment. Unfortunately, the arrangement of two separate frame members and vibratory drive members necessarily increases the cost of the screening device and may require increased head room and plant floor space.

As will be apparent to persons skilled in the art, various modifications, adaptations and variations of the foregoing specific disclosure can be made without departing from the teachings of the present invention.

We claim:

1. A vibratory screening device for dressing and dewatering a fine particle mineral stream flowing along the device comprising a planar screen deck having a feed end for receiving said stream of particles, said deck being adapted for the vibratory conveyance of said mineral particles away from said feed end, a sieve bend screen having at least a midsectional zone of arcuate longitudinal extent for first stage screening of said particle flow and a discharge zone downstream of said midsectional zone for directing said particle flow on said sieve bend screen toward the feed end of said deck, mounting means for fixedly mounting said deck and said sieve bend screen for unitary vibratory movement and linear vibratory drive means for imparting linear vibratory motion to said deck and said sieve bend screen, said linear vibratory motion being in a direction tangential to said arcuate midsectional zone of said sieve bend screen.

2. The screening device of claim 1 wherein said mounting means joins sieve bend screen and said deck for simultaneous linear vibratory motion using the same linear drive means.

3. The screening device of claim 1 wherein said sieve bend screen is adjustably mounted on said mounting means for adjusting the incline thereof toward said feed end of said deck.

4. The screening device of claim 1 wherein said mounting means is a single frame mounting both said sieve bend and said deck, said sieve bend is nested within said frame and said linear vibratory drive means is a single linear drive mounted on said frame.

5. The screening device of claim 1 wherein said deck includes an elongated main deck portion extending from said feed end at an incline of less than 10° to the horizontal and the direction of said linear vibratory motion is at an angle of about 40° to said main deck portion.

6. The screening device of claim 1 including an underflow collector for said deck and a separate underflow trough for said sieve bend screen.

7. A vibratory screening device for dressing and dewatering a fine particle mineral stream flowing along the device comprising a planar screen deck having a feed end for receiving said stream of particles, said deck being adapted for the vibratory conveyance of said mineral particles away from said feed end, a sieve bend screen having at least a midsectional zone of arcuate longitudinal extent for first stage screening of said particle flow and a discharge zone downstream of said midsectional zone for directing said particle flow on said sieve bend screen toward the feed end of said deck, said sieve bend discharge zone being arranged to discharge the particle flow on the sieve bend toward the feed end of the deck in a first flow direction, mounting means for fixedly mounting said deck and said sieve bend screen for unitary vibratory movement and linear vibratory drive means for imparting linear vibratory motion to said deck and said sieve bend screen, said linear vibratory motion being in a direction substantially tangential to said arcuate midsectional zone of said sieve bend screen, said deck being arranged to convey said particle stream in a direction generally opposite to said first flow direction.

8. A vibratory screening device for dressing and dewatering a fine particle mineral stream flowing along the device comprising a planar screen deck having a feed end for receiving said particle stream, said deck being adapted for conveying said particles away from said feed end in a first flow path direction, a sieve screen having a midsectional zone for screening said particle stream and a discharge point at the downstream end of said midsectional zone for directing said particle stream on said sieve screen toward said feed end of said deck, common frame means fixedly mounting said deck and said sieve screen for common vibratory movement, vibratory drive means for imparting said common vibratory movement to said frame, said sieve screen being arranged so that the flow of particles along said screen and from said discharge point is generally in a direction opposite to said first flow path direction along said deck whereby particles flowing from the discharge point of said sieve screen undergo a reversal in direction of flow upon reaching the feed end of said deck.

9. The screening device of claim 8 wherein said sieve screen is adjustable for adjusting the inclination thereof and is provided with a underflow trough for collecting the underflow therefrom.

10. The screening device of claim 8 wherein said deck is adapted for the vibratory conveyance of said particles in said first flow path direction and said particle flow along said sieve screen toward the discharge point is by gravity flow.

11. The screening device of claim 8 wherein the drive means is adapted to impart a force to the sieve screen that is counter current to the flow of particles along said midsectional zone.

12. A vibratory screening device for dressing and dewatering a fine particle mineral stream flowing along the device comprising a sieve screen having at least a midsectional zone of longitudinal extent for screening said particle stream and a discharge point at the downstream end of said midsectional zone, mounting means fixedly mounting said sieve screen at an acute angle to the horizontal for vibratory movement and linear vibratory drive means for imparting linear vibratory motion to said sieve screen, said linear vibratory motion being in a direction to impart a force counter current to the particle flow at said midsectional zone of said sieve screen and tangential to said zone.

13. The screening device of claim 12 wherein said sieve screen is mounted for adjusting the inclination thereof and is provided with an underflow trough for collecting the underflow therefrom.

14. The screening device of claim 13 wherein said sieve screen is pivotally mounted at one end thereof for pivotally adjusting the inclination of said sieve.

15. The screening device of claim 12 wherein at least said midsectional zone of said sieve screen is concave.

16. The screening device of claim 12 wherein said sieve screen is concave and has an uppermost end mounted substantially vertically for gravity flow of particles therealong.

17. A method of dressing and dewatering a fine particle mineral stream comprising the steps of feeding said stream to a vibratory sieve screen for flow therealong in a first flow direction, imparting vibratory motion to the screen in a linear direction tangential to the flow along a midsectional flow zone of said sieve screen to impart to the particles thereon a principal force in a direction counter current to the flow of the particles in said first flow direction and provide a first stage screening of the particle stream, subsequently discharging the particles fed along the sieve screen and directing the flow of said discharged particles onto a planar vibratory screen deck for conveyance along said deck, imparting vibratory motion to said deck as said particles flow therealong in a direction generally opposite to said first flow direction to provide a second stage screening of said particle stream.

18. The method of claim 17 wherein the flow of said stream in said first direction is a gravity flow along said sieve screen.

19. The method of claim 17 wherein said first flow direction is of arcuate contour along at least its midsectional flow zone along the sieve screen.

20. The method of claim 17 wherein said discharged particles are directed to a downwardly sloping portion of the screen deck for said second stage screening and subsequently conveying said particles from said sloping portion to an inclined portion of the screen deck for vibratory conveyance therealong while effecting tertiary screening thereof to form a drip free cake of particles from said particle stream.

21. The method of claim 17 including the step of separately collecting the underflow from said first and second stage screening.

22. A method of dressing and dewatering a fine particle mineral stream comprising the steps of feeding a particle stream to a downwardly sloping vibratory sieve screen for gravity flow therealong, imparting linear vibratory motion to said sieve screen in a direction counter current to the gravity flow of the particle stream along a midsectional flow zone of said sieve screen, subsequently discharging the particles fed along the screen and collecting the underflow separated by the screen from the particle stream, wherein said gravity flow is along an arcuate path along said midsectional flow zone and said linear vibratory motion is tangential to said arcuate path.

23. The method of claim 22 including the step of collecting the discharged particles on a vibratory screen deck and further screening the collected particles using linear vibratory motion applied in a oblique direction to the movement of particles along the deck.

* * * * *